Figure 1:
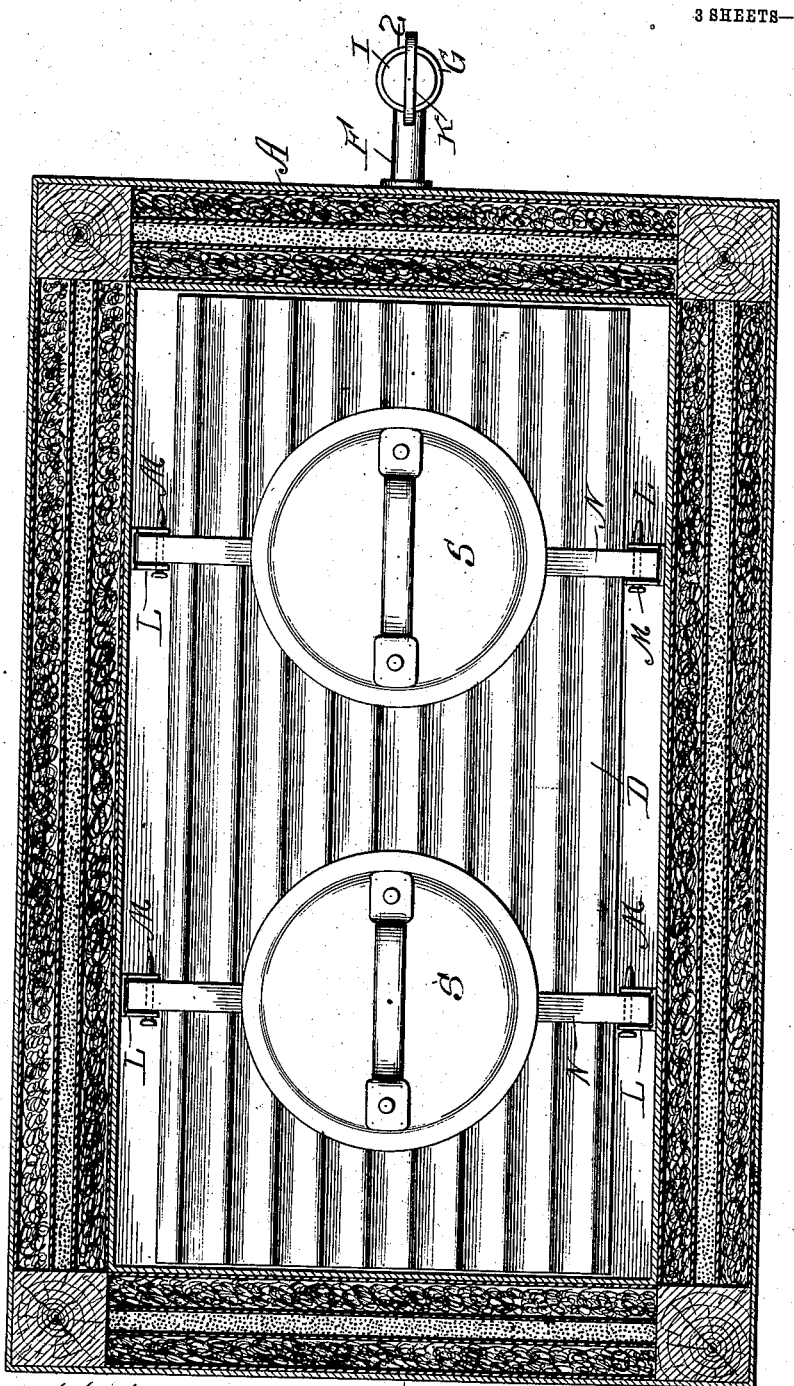
Figure 2:
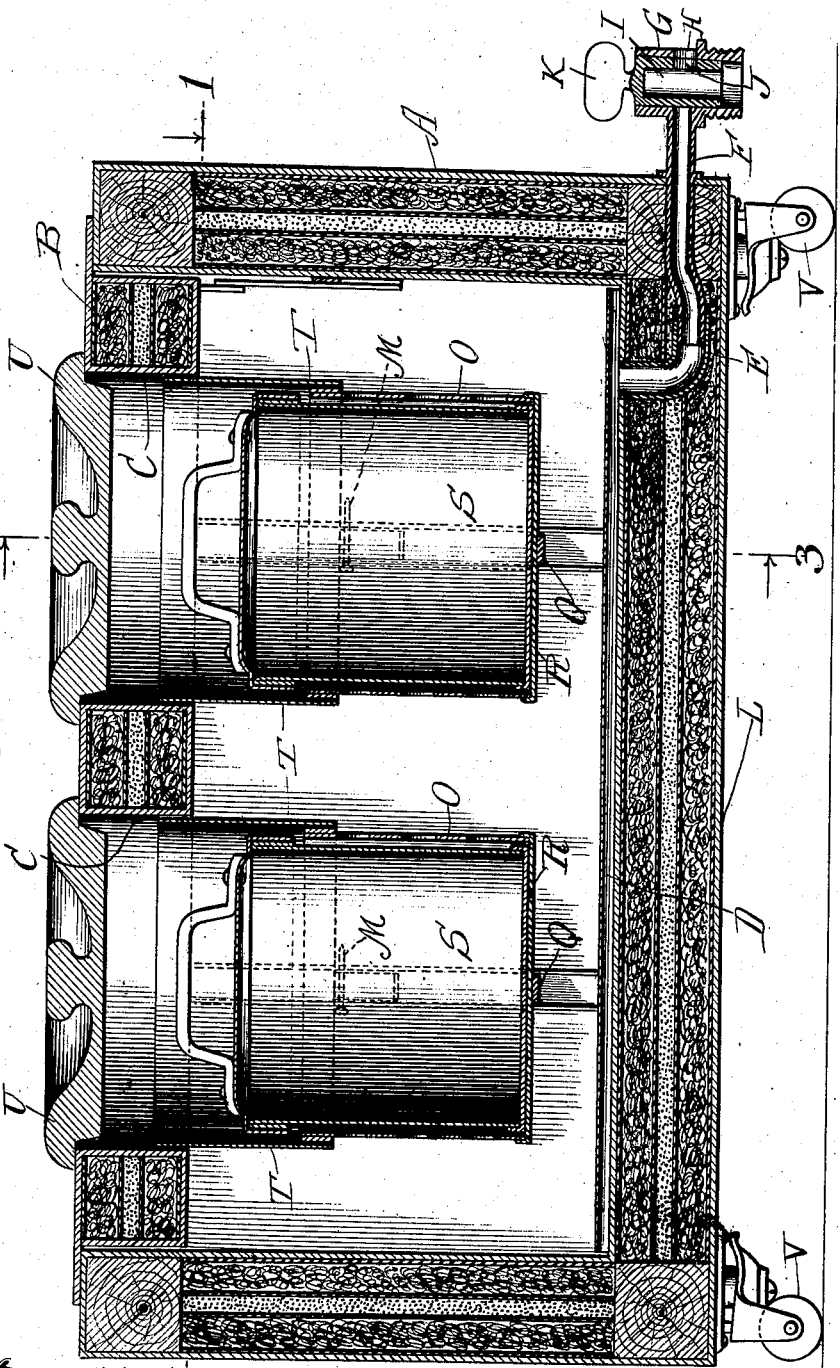
Figure 3:
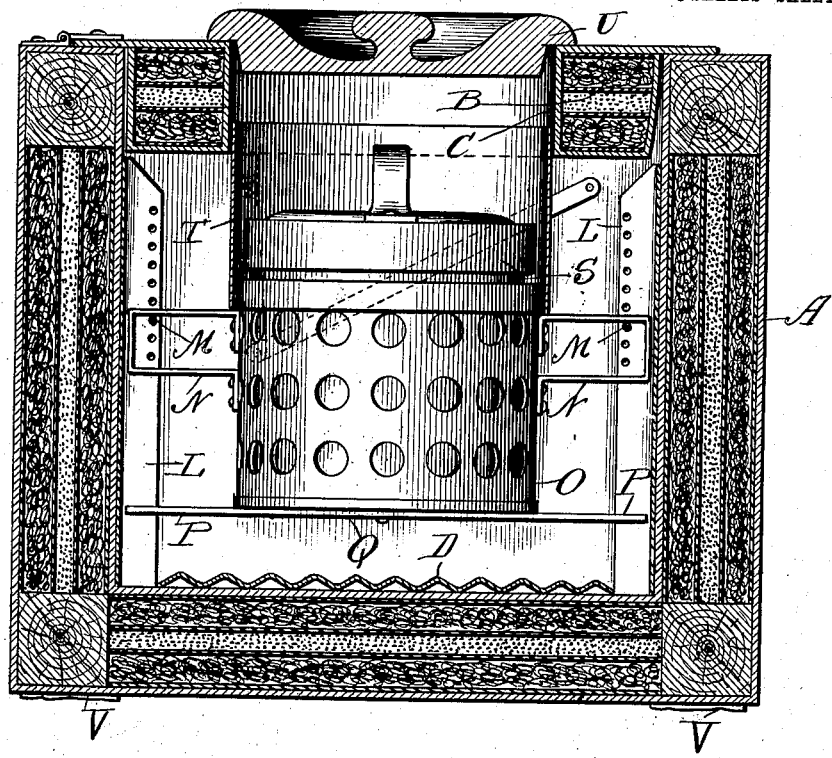
Figure 4:
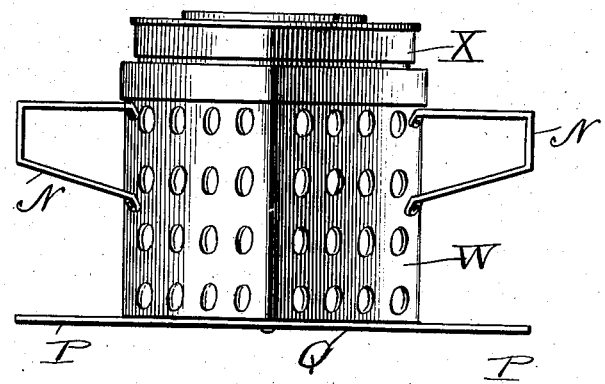

C. DOERING, Jr.
REFRIGERATOR.
APPLICATION FILED JULY 6, 1908.

918,977.

Patented Apr. 20, 1909.
3 SHEETS—SHEET 1.

Witnesses
R. A. White
Harry R. Levine

Inventor
Charles Doering, Jr.
By Rudolph ... Atty.

C. DOERING, Jr.
REFRIGERATOR.
APPLICATION FILED JULY 6, 1908.

918,977.

Patented Apr. 20, 1909.
3 SHEETS—SHEET 2.

Witnesses
R. A. White
Harry R. L. White

Inventor
Charles Doering Jr.
By Rudolph Wm. Lotz Atty.

C. DOERING, Jr.
REFRIGERATOR.
APPLICATION FILED JULY 6, 1908.

918,977.

Patented Apr. 20, 1909.
3 SHEETS—SHEET 3.

Witnesses
R. A. White
Harry R. L. White

Inventor
Charles Doering, Jr.
By Rudolph Wm. Lotz, Atty.

UNITED STATES PATENT OFFICE.

CHARLES DOERING, JR., OF OAK PARK, ILLINOIS.

REFRIGERATOR.

No. 918,977.    Specification of Letters Patent.    Patented April 20, 1909.

Application filed July 6, 1908. Serial No. 442,128.

*To all whom it may concern:*

Be it known that I, CHARLES DOERING, Jr., citizen of the United States, residing at Oak Park, in the county of Cook and State of Illinois, have invented certain new and useful Improvements in Refrigerators; and I do hereby declare the following to be a full, clear, and exact description of the invention, such as will enable others skilled in the art to which it appertains to make and use the same.

This invention relates to a novel construction in a cabinet particularly adapted for the storage of ice cream or other frozen viands, the object being to provide a device of this character which may be filled with cracked ice and salt prior to the insertion therein of the receptacle containing the frozen viands without interference with free handling of said receptacles and consists in the features of construction and combinations of parts hereinafter fully described and claimed.

In the accompanying drawings illustrating my invention: Figure —1— is a plan section of a storage cabinet constructed in accordance with my invention taken on the line —1— of Fig. —2—. Fig. —2— is a central vertical longitudinal section of the same on the line —2— of Fig. —1—. Fig. —3— is a vertical tranverse section of the same on the line 3—3 of Fig. —2—. Fig. —4— is a detail view in side elevation of square receptacle for similarly shaped cans shown as contained therein.

Receptacles containing ice cream and other frozen viands must be kept packed in cracked ice and salt, and are contained in tubs of larger diameter to provide an annular space to receive the freezing medium. At soda fountains and in ice cream parlors and cafés cabinets are generally provided to receive the cans, such cabinets being filled with the freezing medium after the cans have been inserted. The removal of an empty can to be replaced with a full one is attended with some difficulty owing to the fact that upon removal of the empty can the cracked ice surrounding the same falls into the recess and prevents the next can from being lowered the requisite distance. Some of such cabinets are equipped with hinged covers which must be raised whenever access to the cans is desired and consequently occasion much loss of cold air. Others are coverless and cause even greater waste of ice.

Where the cans rest upon and are surrounded by ice, they are very easily rotated and render the removal of ice cream therefrom relatively difficult especially when the can is more than half empty and is correspondingly light. The level of ice maintained is always very near the top of the can and it not infrequently happens that salted ice or salt water finds its way into the can and spoils the contents thereof in part.

The objects of my invention are to provide a storage cabinet for ice cream and other frozen viands which is so constructed as to maintain the cracked ice and salt out of contact with the outside air as far as possible during the operations of removing ice cream from the can and the consequent removal and replacement of the cover; to provide within the cabinet adjustable supports for the ice cream cans to permit cans of various depths to be used and their positions adjusted not only in relation to the various depths thereof but also to suit the convenience of the dispenser, such supports constituting wells to receive the cans; to provide means whereby cracked ice and salt may be introduced prior to or after the introduction of the cans containing ice cream and the like and wherein the body of the said ice and salt may attain a level above the highest point in the ice cream can without danger of any of the same finding its way into said can; and to provide a trap drain for the cabinet which will prevent escape of cold air and which is readily cleansed at all times.

My said cabinet comprises a rectangular receptacle A having a hinged cover B, the latter being provided with one or more openings C through which access to contained cans is had.

The walls and bottom of the receptacle A and the cover B thereof are relatively thick and built up of layers of heat insulating materials in any well known manner to prevent radiation.

The receptacle A is provided with a false bottom D preferably of corrugated sheet metal upon which the ice rests, the water from melted ice passing underneath said false bottom to the drain E. The latter comprises an elbow pipe communicating at one end with said receptacle, said end being flush with the bottom thereof, and connected at its other end with the inlet pipe F of a valve chamber G, the latter consisting of a vertically disposed tapered tube provided with an opening H in alinement with the delivery end of the pipe F, said valve chamber G receiving the tapered hollow valve I provided with a lateral opening J through which water passes when said valve is turned by means of its stem K so that said opening registers with the delivery end of said pipe F. Said valve I is rendered easily removable so that the drain passage may be cleansed by means of a flexible ram-rod inserted through the opening J into the drain passage. The said pipe F is distorted between its ends so as to raise the delivery end portion thereof sufficiently above the inlet end portion to form a trap in the drain passage whereby air is prevented from entering or leaving the lower end portion of said receptacle A. To the inner faces of the end walls of said receptacle A vertically disposed channel bars L are secured in alinement with the diameters of the openings C in the cover, the flanges of said channel bars being perforated to receive supporting pins M. The latter pass through the looped arms N of foraminated cylinders O, the latter being maintained by said arms N at the upper ends and projections P at the lower ends of said cylinders in vertical alinement with the openings C in said cover B, said cylinders being adjustable to various elevations to suit requirements by passing said supporting pins M through higher or lower perforations. The said projections P constitute the outer ends of cross bars Q which together with transverse cross bars R spanning the lower ends of said cylinders form supports for the cans S containing the frozen viands. The open spaces between the upper ends of the said cylinders O and the lower face of the cover B are closed by means of cylindrical sleeves T adapted to pass telescopically through the openings C and rest at their lower ends upon the said arms N of said cylinders O and overlapping the uppermost end portions thereof. The said openings C are closed by means of covers U of wood or other non-conducting material which are removed whenever access to the cans S is desired, the removal thereof causing no appreciable loss of cold air by reason of the fact that said sleeves T coact with the cylinders O to form isolated wells for said cans. The said cylinders O are preferably of less depth than the contained cans so that the upper ends of the latter project therefrom, this being essential to ease of handling and causing the sleeves T to overlap the upper ends of said cans sufficiently to prevent ice and salt finding their way into the same, it being possible by reason of said sleeves to bring the level of cracked ice considerably above the upper ends of the cans without danger of its admission into the latter.

The receptacle A is preferably supported on casters V to enable it to be easily moved. In place of the cylinders O the rectangular wells W shown in Fig. —4— may be employed, the latter receiving rectangular cans X adapted to contain brick creams.

The chilling effect of the ice and salt is readily conveyed to the cans through perforations in the cylinders O and by reason of the higher level of the cooling medium maintainable and the more perfect isolation thereof, the requisite low temperature is maintained at minimum expense. By means of the said foraminated wells provided the convenience of handling is greatly increased.

I claim as my invention:

1. A device of the kind specified comprising a receptacle equipped with a hinged cover having an opening therein, vertical supports disposed diametrically opposite each other with relation to the opening in said cover, a foraminated cylinder equipped with arms engaging said supports and supported in vertical alinement with said opening in said cover, said cylinder being adapted to receive and support a can.

2. A device of the kind specified comprising a receptacle equipped with a hinged cover having an opening therein, vertical supports provided with perforations at various elevations disposed diametrically opposite each other with relation to the opening in said cover, supporting pins removably mounted in said perforations, a foraminated cylinder equipped with arms engaging said supporting pins to support said cylinder at different elevations, said arms serving to maintain said cylinder in vertical alinement with said opening in said cover.

3. A device of the kind specified comprising a receptacle equipped with a hinged cover having an opening therein, a trap drain in the bottom of said receptacle, vertical supports disposed diametrically opposite each other with relation to the opening in said cover, a foraminated cylinder equipped with arms engaging said supports and supported in vertical alinement with said opening in said cover, said cylinder being adapted to receive and support a can.

4. A device of the kind specified comprising a receptacle equipped with a hinged cover having an opening therein, a trap drain in the bottom of said receptacle, vertical supports provided with perforations at various elevations disposed diametrically opposite each other with relation to the opening in said cover, supporting pins removably mounted in said perforations, a foraminated cylinder equipped with arms engaging said supporting pins to support said cylinder at different elevations, said arms serving to maintain said cylinder in vertical alinement with said opening in said cover.

5. A device of the kind specified comprising a receptacle equipped with a cover having an opening therein, vertically disposed channel bars secured to the walls of said receptacle diametrically opposite each other with relation to the said opening in the cover, the flanges of said channel bars being provided with perforations at different elevations, supporting pins mounted in said perforations and a foraminated cylinder equipped with supporting arms engaging said supporting pins and maintained in vertical alinement with said opening in said cover, said cylinder being adapted to receive and support a can.

6. A device of the kind specified comprising a receptacle equipped with a cover having an opening therein, vertically disposed channel bars secured to the walls of said receptacle diametrically opposite each other with relation to the said opening in the cover, the flanges of said channel bars being provided with perforations at different elevations, supporting pins mounted in said perforations and a foraminated cylinder equipped with supporting arms engaging said supporting pins and maintained in vertical alinement with said opening in said cover, said cylinder being adapted to receive and support a can, and a sleeve passing telescopically through said opening in said cover and resting it at its lower end upon said supporting arms.

In testimony whereof I have signed my name in the presence of two subscribing witnesses.

CHARLES DOERING, Jr.

Witnesses:
JOHN H. BAUMGARTEN,
CARL DOERING.